US010422453B2

United States Patent
Dallmer

(10) Patent No.: US 10,422,453 B2
(45) Date of Patent: Sep. 24, 2019

(54) SEALING SYSTEM FOR SEALING OF A DRAIN ARRANGEMENT

(71) Applicant: Dallmer GmbH & Co. KG, Arnsberg (DE)

(72) Inventor: Johannes Dallmer, Arnsberg (DE)

(73) Assignee: DALLMER GMBH & CO. KG, Arnsberg (DE)

( * ) Notice: Subject to any disclaimer, the term of this patent is extended or adjusted under 35 U.S.C. 154(b) by 0 days.

(21) Appl. No.: 15/937,665

(22) Filed: Mar. 27, 2018

(65) Prior Publication Data

US 2018/0216761 A1   Aug. 2, 2018

Related U.S. Application Data

(62) Division of application No. 15/061,276, filed on Mar. 4, 2016, now abandoned.

(30) Foreign Application Priority Data

Mar. 6, 2015  (DE) ........................ 10 2015 103 342

(51) Int. Cl.
  *E03F 5/04*     (2006.01)
  *F16L 21/02*    (2006.01)

(52) U.S. Cl.
  CPC ............ *F16L 21/02* (2013.01); *E03F 5/0407* (2013.01); *E03F 5/0409* (2013.01); *Y10T 137/6988* (2015.04)

(58) Field of Classification Search
  CPC .................. E03F 5/0407; E03F 5/0409; E03F 2005/0413; Y10T 137/6988
  See application file for complete search history.

(56) References Cited

U.S. PATENT DOCUMENTS

| 1,873,275 | A | 12/1930 | Boosley |
| 2,672,205 | A | 8/1950 | McDonald |
| 3,893,919 | A | 7/1975 | Flegel et al. |
| 3,896,511 | A | 7/1975 | Cuschera |
| 3,937,497 | A | 2/1976 | Studer |
| 4,263,138 | A * | 4/1981 | Kessel ............ E03C 1/29 210/163 |
| 4,850,617 | A | 7/1989 | Moberly |
| 7,472,719 | B2 | 1/2009 | Dallmer |
| 8,112,827 | B2 | 2/2012 | Degooyer et al. |
| 8,661,574 | B2 | 3/2014 | Larsson |
| 2008/0290012 | A1* | 11/2008 | Shih ............ E03F 5/0407 210/163 |
| 2014/0224354 | A1 | 8/2014 | Willburn |

FOREIGN PATENT DOCUMENTS

| DE | 202014007357 | 1/2015 |
| EP | 2423395 | 2/2012 |

OTHER PUBLICATIONS

Search Report issued by German Patent Office dated Nov. 23, 2015, see p. 3.

* cited by examiner

*Primary Examiner* — Kevin F Murphy
(74) *Attorney, Agent, or Firm* — Cohen & Hildebrand, PLLC

(57) ABSTRACT

Sealing device (1) for sealing a drainage arrangement, including a flexible sealing film (3) with an opening (4), through which waste water can pass, and a connecting portion that is connected with the sealing foil (3) and that can be connected with a portion of the drainage arrangement.

5 Claims, 14 Drawing Sheets

Fig. 19
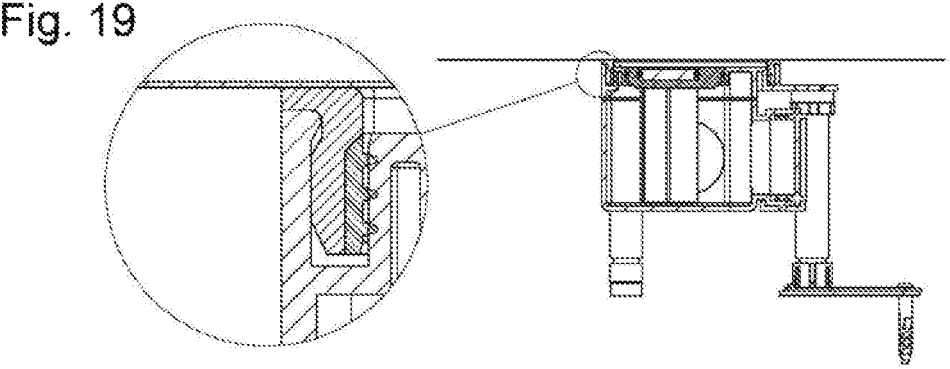
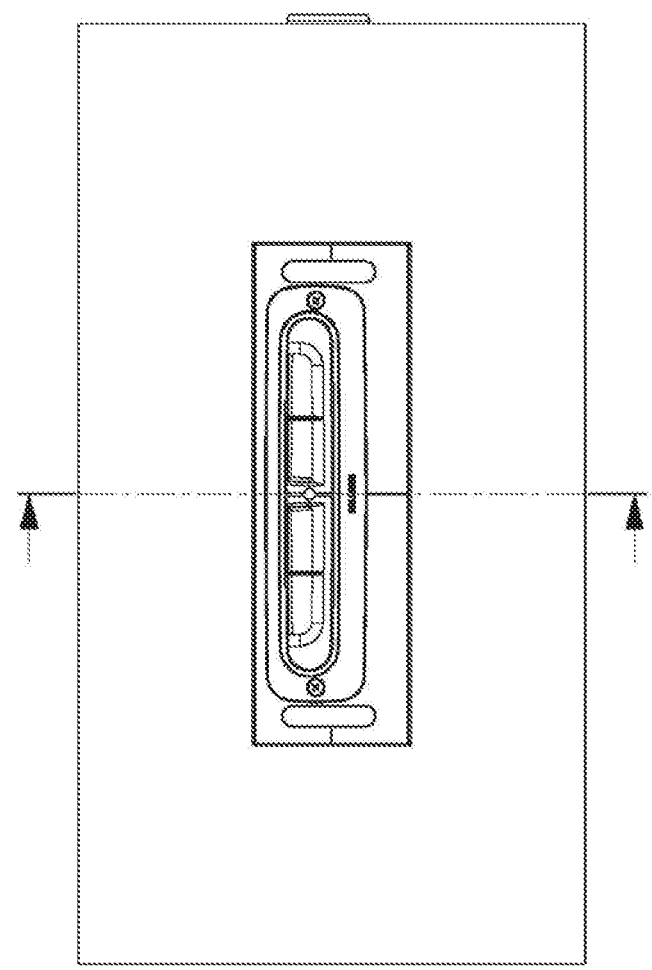
Fig. 20

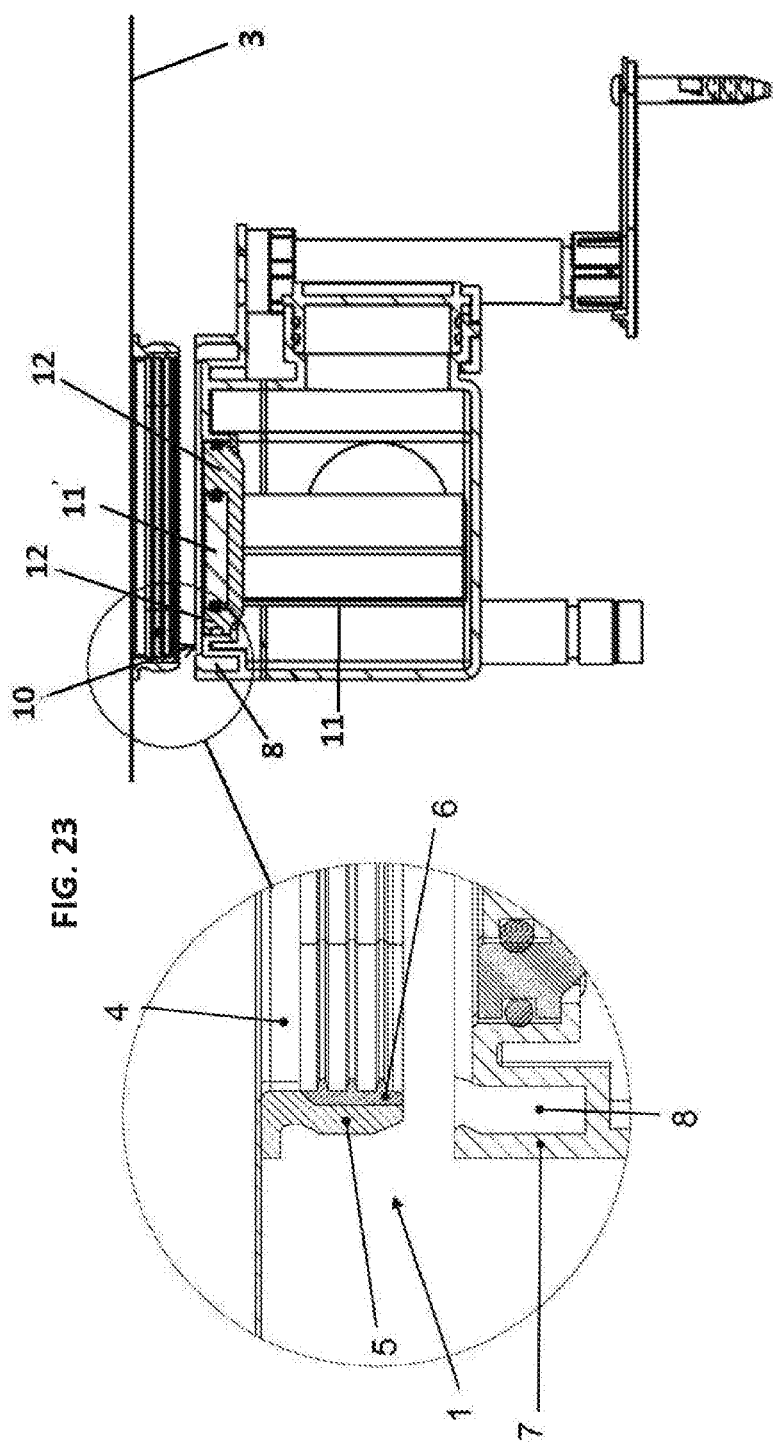

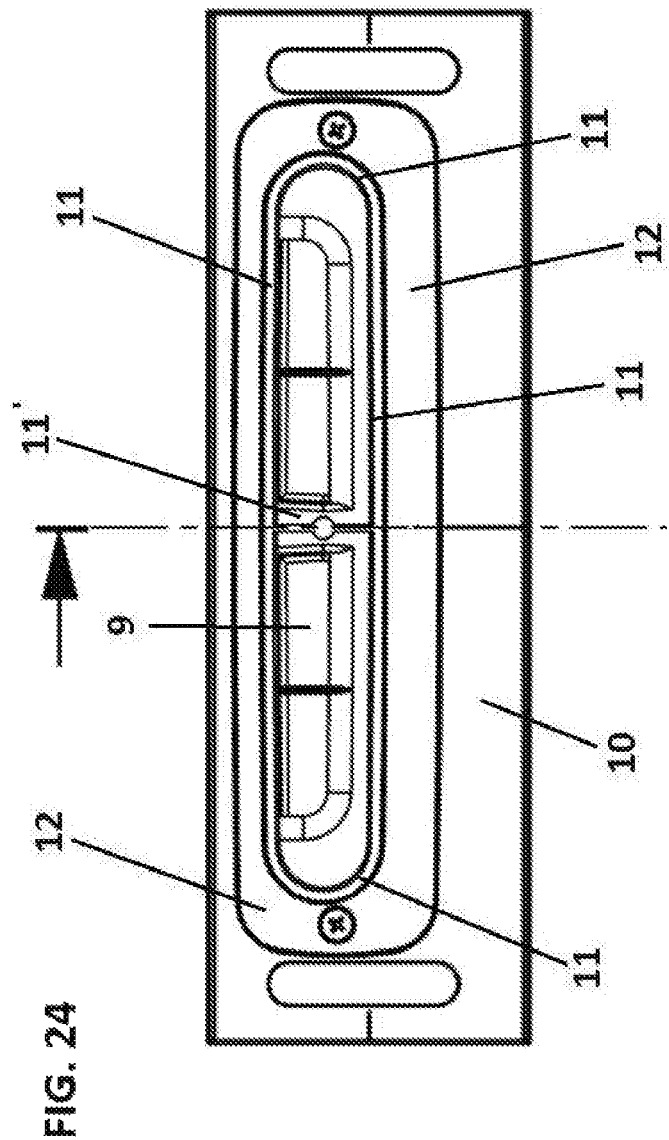

SEALING SYSTEM FOR SEALING OF A DRAIN ARRANGEMENT

CROSS-REFERENCE TO RELATED APPLICATIONS

This application is a divisional application of U.S. patent application Ser. No. 15/061,276, filed on Mar. 4, 2016, which claims priority to DE 10 2015 103 342.9, filed on Mar. 6, 2015, each of which is herein incorporated by reference in their entirety.

BACKGROUND OF THE INVENTION

The present invention relates to sealing devices for sealing a drainage arrangement, a drainage arrangement for at least partial installation in the floor of an area with such sealing devices and a drainage device for draining water from an area with such a drainage arrangement.

Sealing devices, a drainage arrangement and a drainage device of the aforementioned type are known from EP 2 423 395 A1. In the drainage arrangement described therein, a rubber ring of the sealing device acting as a support is introduced into the opening of the drain opening of the drainage body and retained therein in particular by the drain port of the water collection device, which are constructed as a drainage channel.

Disadvantageously, the rubber ring can be compromised, for example displaced, as a result of the insertion and adjustment of the drain port, thus preventing a sealing action. Moreover, odor traps disposed in the drain opening can no longer be displaced at a later time.

SUMMARY OF THE INVENTION

The problem which is addressed by the present invention is the creation of sealing devices, of a drainage arrangement and of a drainage device of the aforementioned type that can be more flexibly adapted to different local requirements and/or that can provide a more reliable seal.

Particularly advantageous is a design where the groove surrounds the opening and is at least partially spaced apart from the opening, so that a gap for supporting the seal is created between the opening and the groove which encircles the opening. This gap can be used, for example, to displace a portion of water collection devices placed on top of the drainage housing. The displacement allows adaptation to local situations. Furthermore, an odor trap insert and a shuttle frame for the odor trap insert can be arranged in the gap between the groove and the opening. The shuttle frame allows the odor trap to be placed at different positions, thus also facilitating adaptation to the local situation.

Furthermore, arranging the support of the seal outside the opening enhances the reliability of the seal, in particular, because the sealing device is not contacted when a connecting piece is inserted in the opening or when the odor trap is inserted and removed.

BRIEF DESCRIPTION OF THE DRAWINGS

Further features and advantages of the present invention will become apparent from the following description of preferred exemplary embodiments with reference to the appended drawings, which show in:

FIG. 19 is a cross-sectional view of the drainage device of according to the invention with sealing devices according to the invention along the line indicated by an arrow in FIG. 20;

FIG. 20 is a plan view of a drainage device of according to the invention with sealing devices according to the invention;

FIG. 23 is a cross-sectional view of the drainage device of according to the invention with sealing devices according to the invention along the line indicated by an arrow through cross-bar 11' of the odor trap 11 in FIG. 24; and FIG. 24 is a plan view of a drainage device of according to the invention with sealing devices according to the invention;

In the figures, identical and functionally identical parts are provided with identical reference numerals.

DETAILED DESCRIPTION OF THE INVENTION

Figure 1:
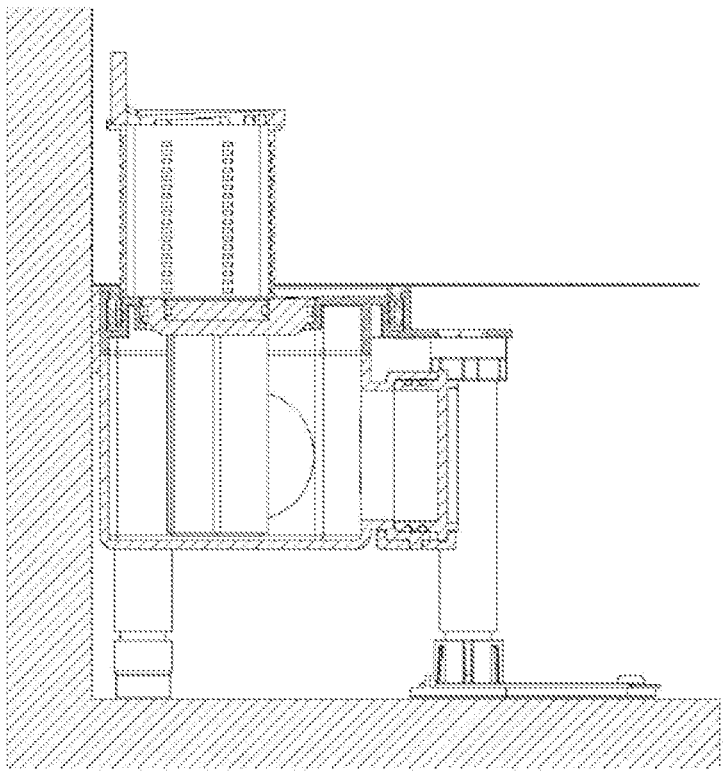
FIG. 1 to FIG. 10 cross-sections through a drainage device according to the invention with a water collecting device designed as a drainage channel.
Figure 2:
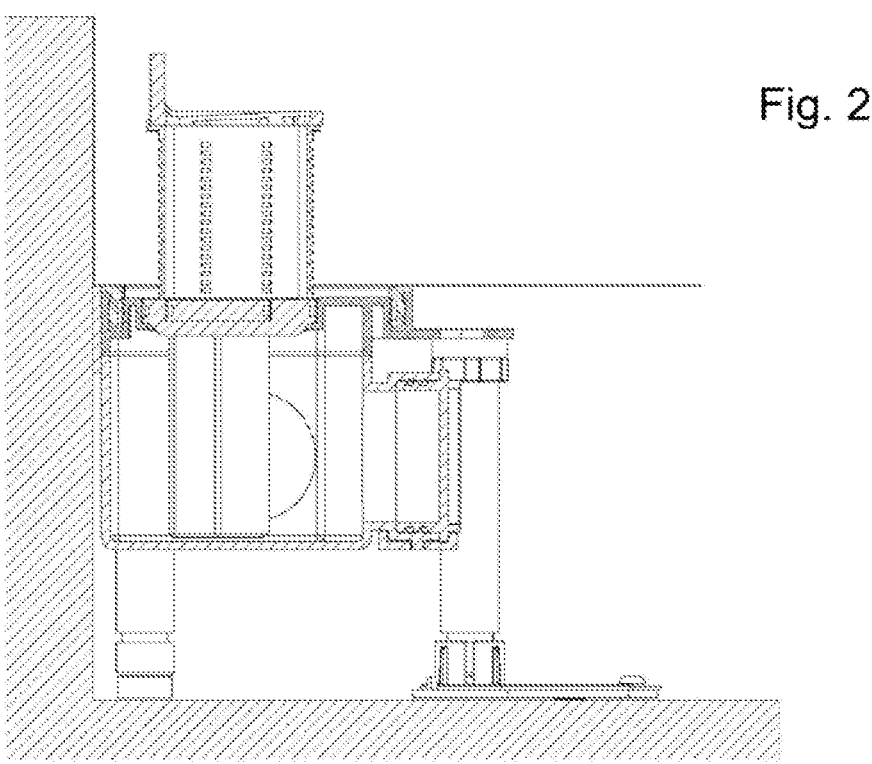

FIG. 23 and FIG. 24 show a sealing device 1 according to the invention before attachment to a drainage body 2 of a drainage arrangement according to the invention. The sealing device 1 has a waterproof sealing film 3, which can be composed of different types of plastics. The sealing film 3 has an, in particular rectangular, opening 4 (see FIG. 24), through which water can flow to the drainage body 2.

A support 5, which has on its side facing the opening 4 a circumferential seal 6, in particular a lip seal, is attached at the bottom side of the sealing film 3. The support 5 may be constructed of a hard plastic such as PP. The seal 6 may be constructed of a soft plastic such as TPE.

Figure 3:
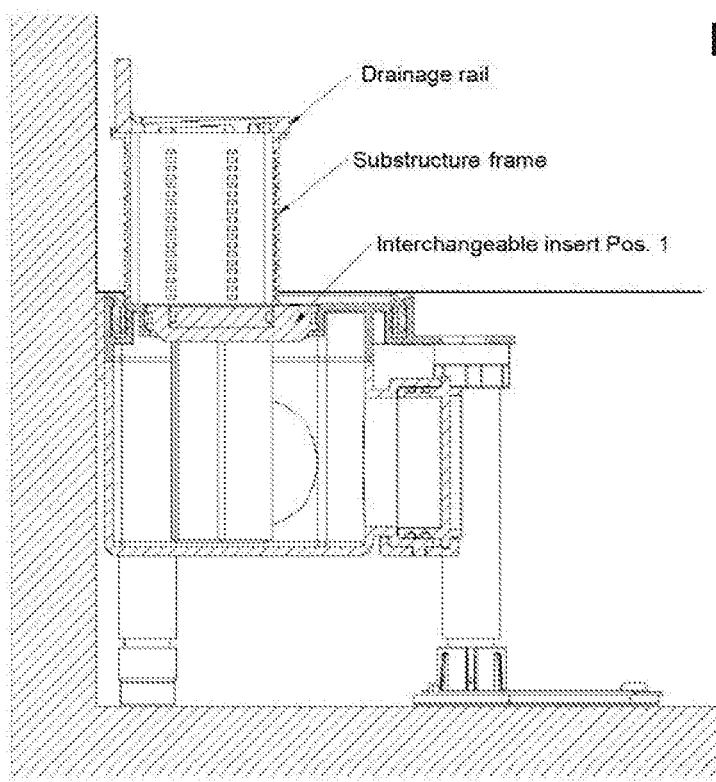
Figure 4:
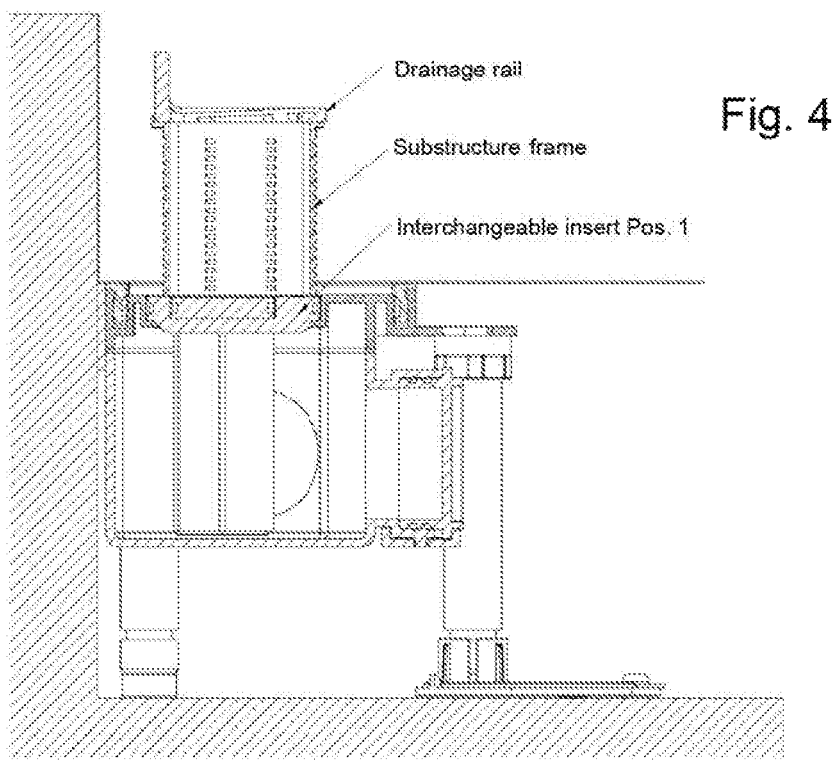
Figure 5:
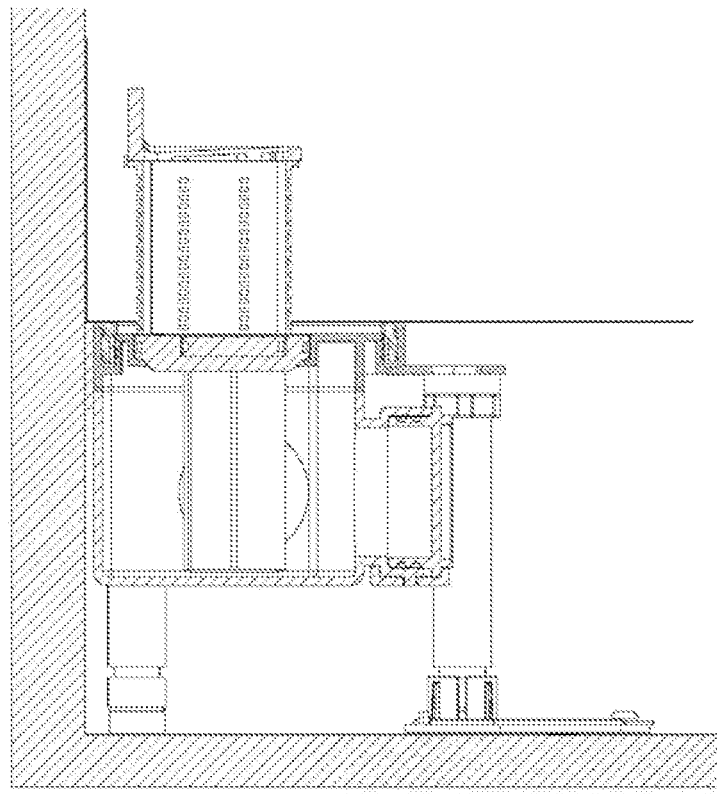
Figure 6:
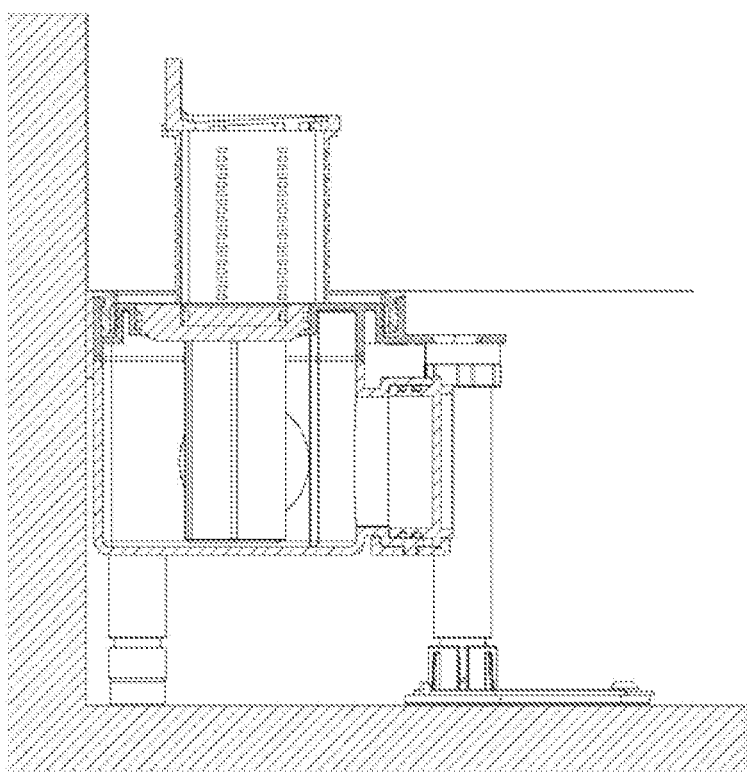
Figure 7:
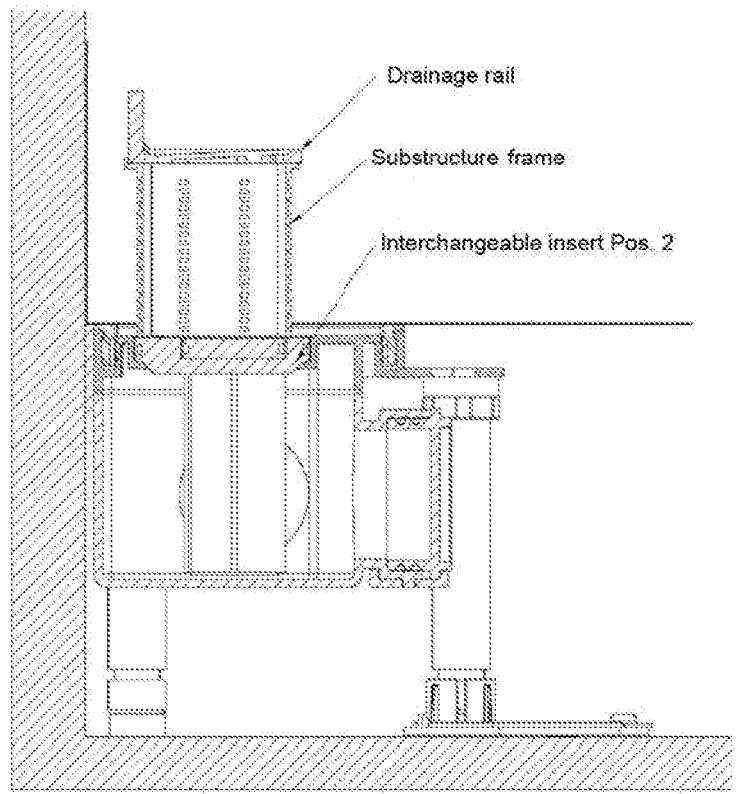
Figure 8:
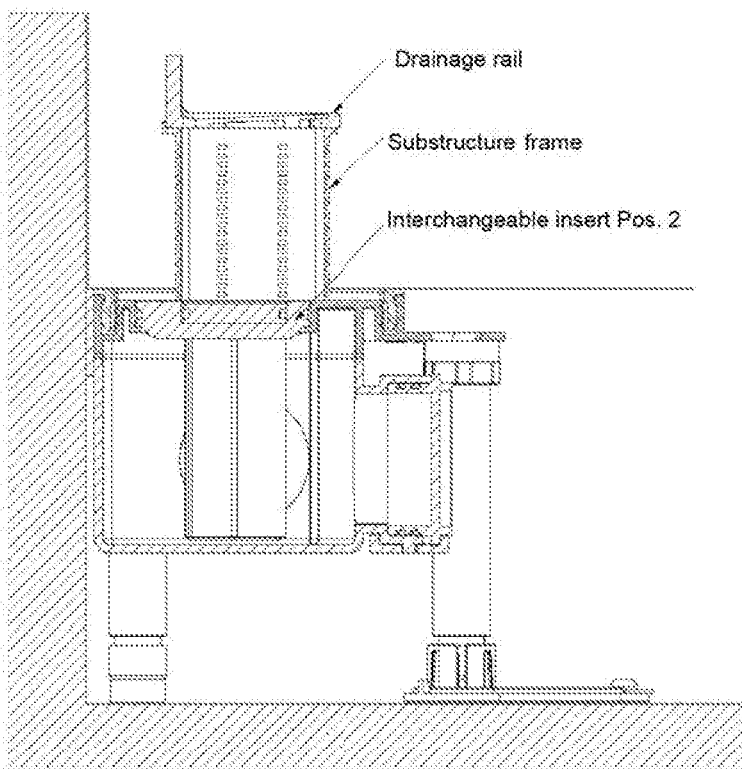
Figure 9:
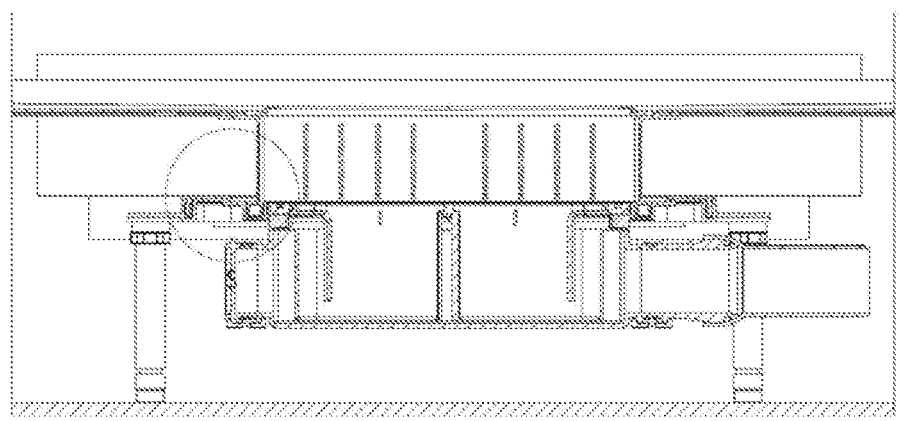
Figure 10:
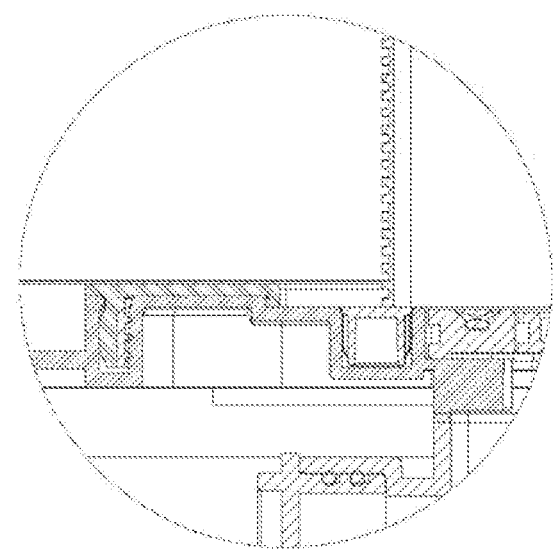
Figure 11:
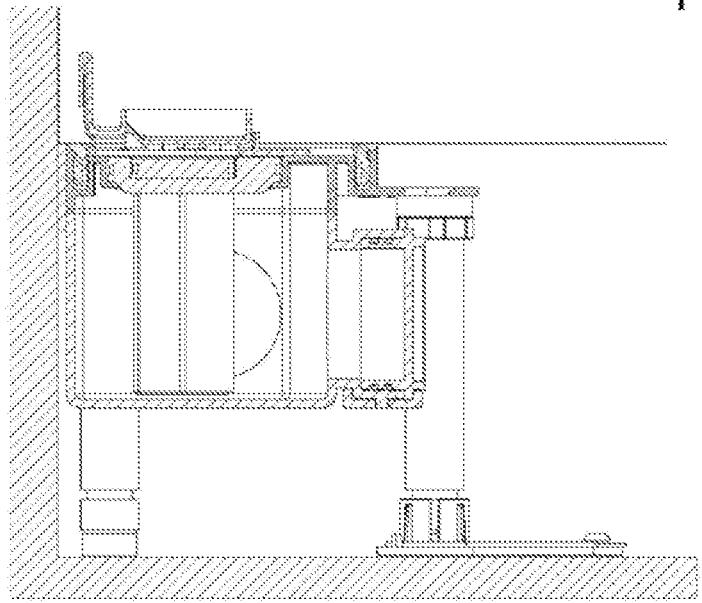
FIG. 11 to FIG. 18 cross-sections through a drainage device according to the invention with a water collecting device designed as a drainage profile.
Figure 12:
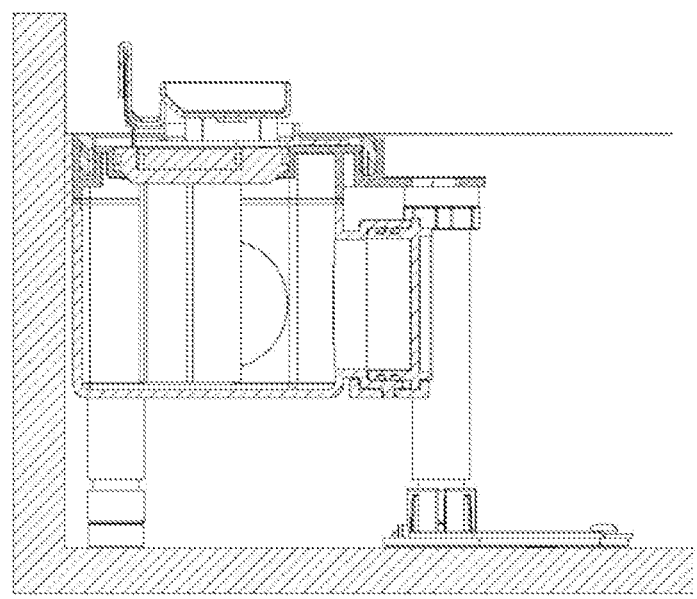
Figure 13:
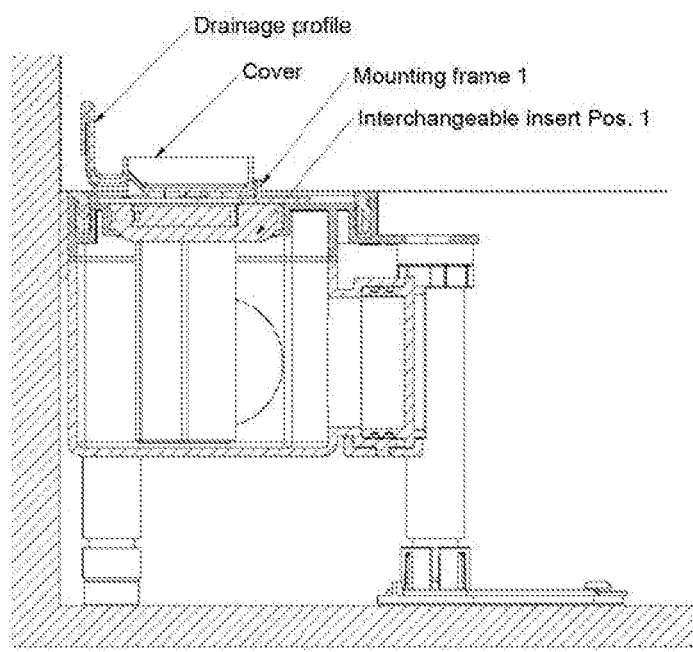
Figure 14:
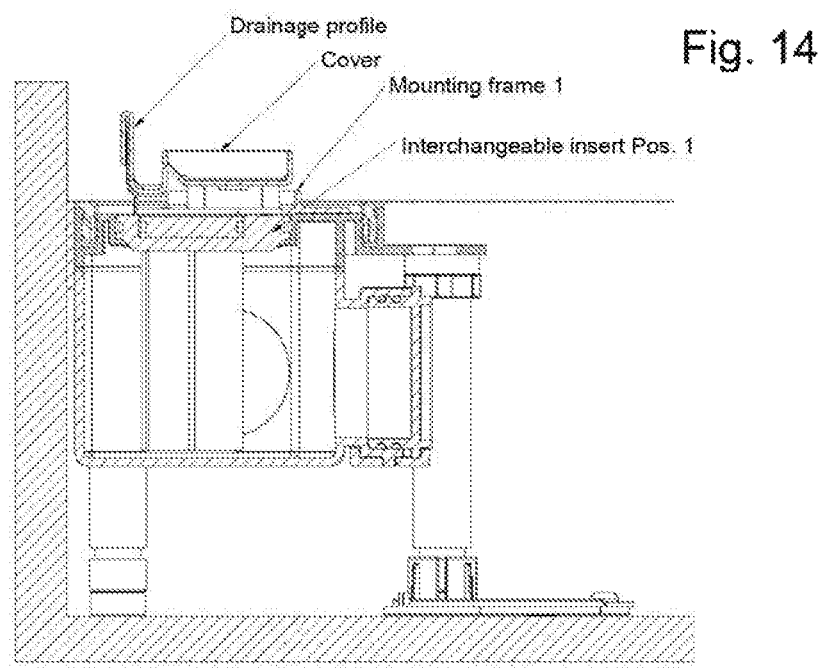
Figure 15:
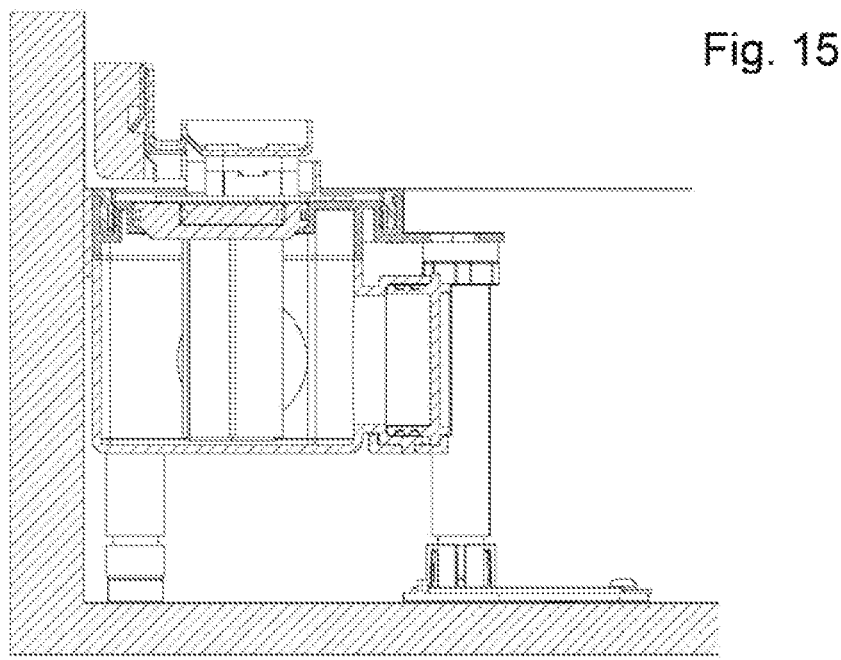
Figure 16:
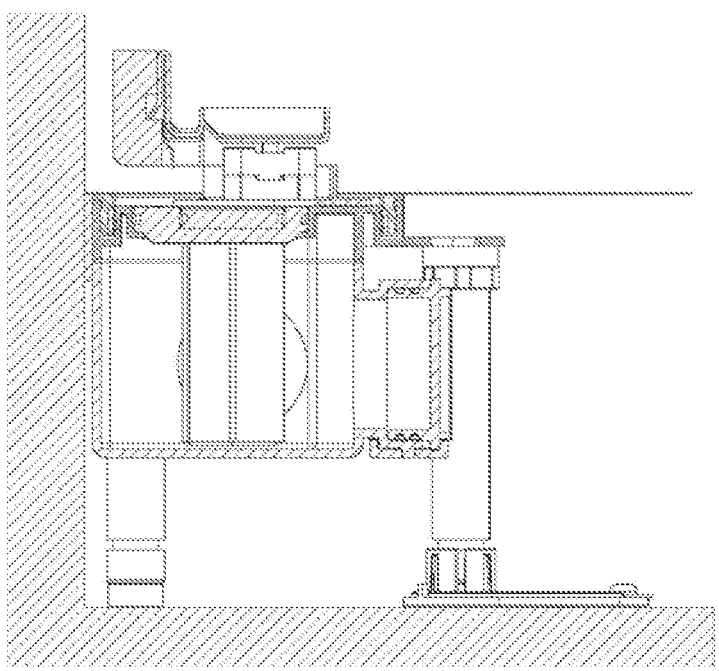
Figure 17:
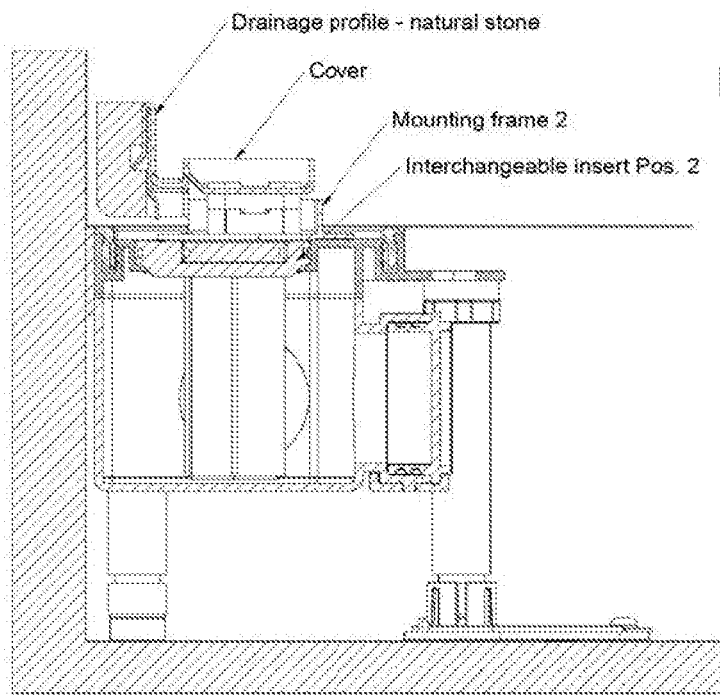
Figure 18:
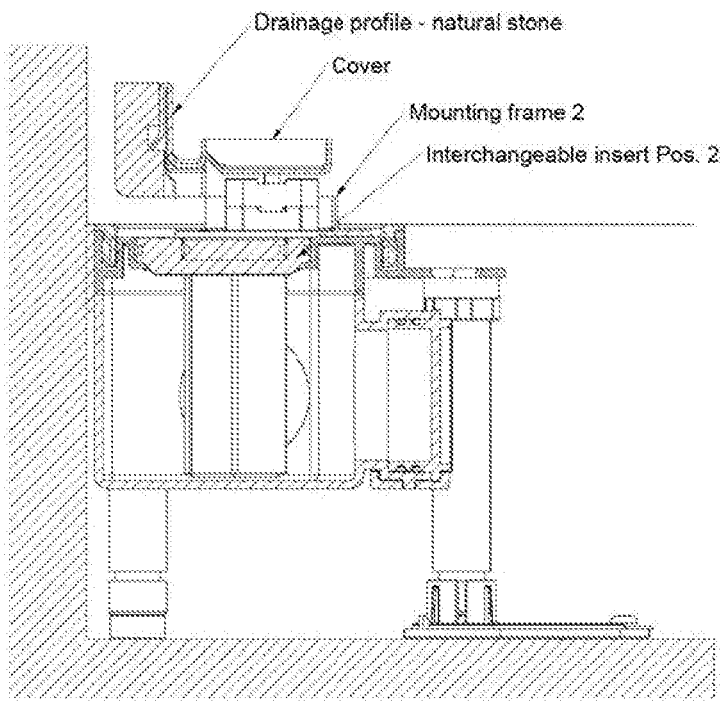

The drainage body 2 is constructed as drainage housing with a housing cover 7 which also has an, in particular rectangular (see FIG. 24), opening 9. The support 5 with the seal 6 can be inserted, preferably snapped or clipped, into a circumferential groove 8 of housing cover. A gap 10, which can be used, for example, to displace a portion of the water collecting device (see, for example, the substructure frame in FIG. 3 and FIG. 4) disposed on top of the drainage housing, remains between the groove 8 and the opening 9.

Figure 21:
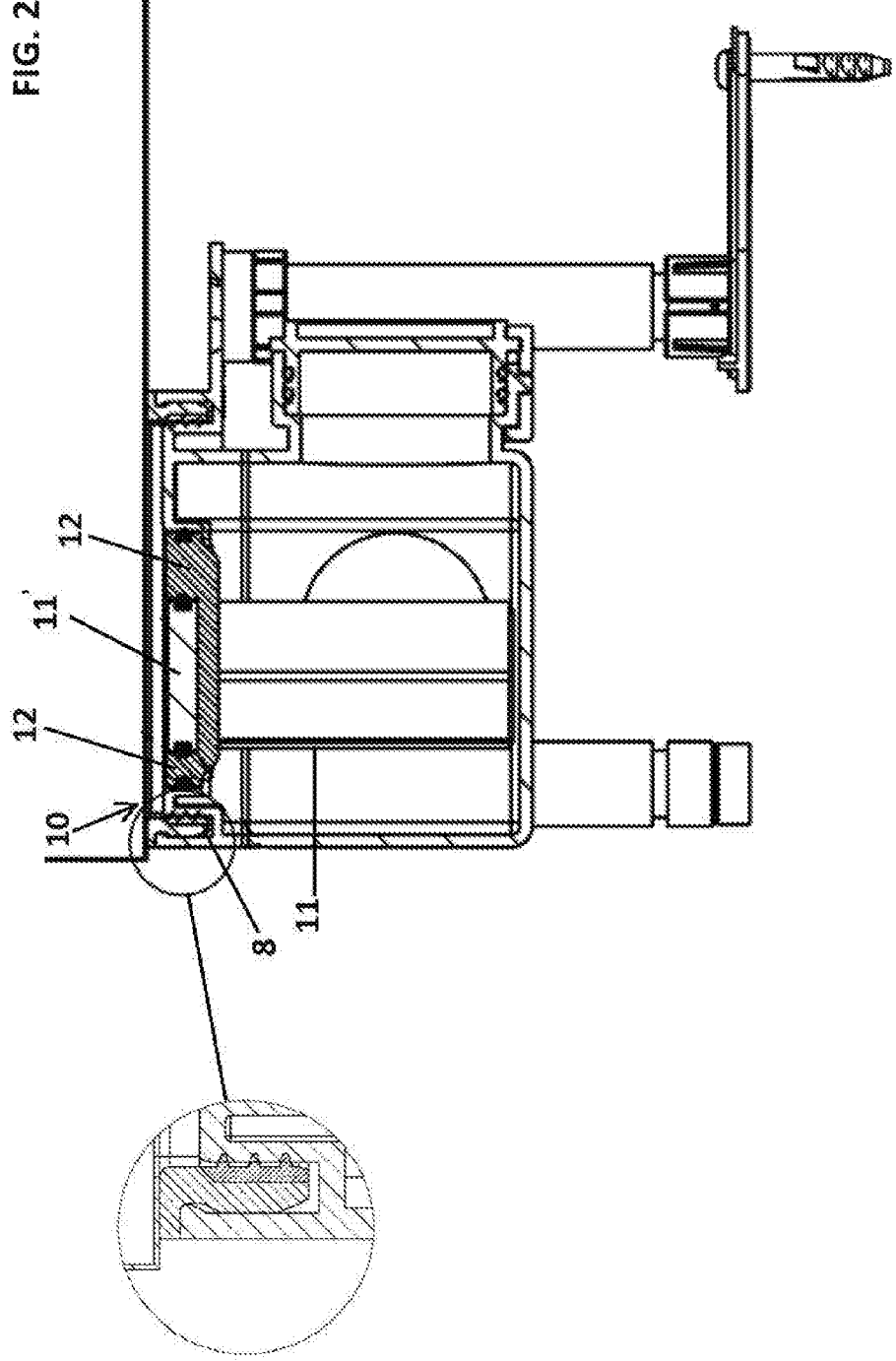
FIG. 21 is a cross-sectional view of the drainage device of according to the invention with sealing devices according to the invention along the line indicated by an arrow through cross-bar 11' of the odor trap 11 in FIG. 22.
Figure 22:
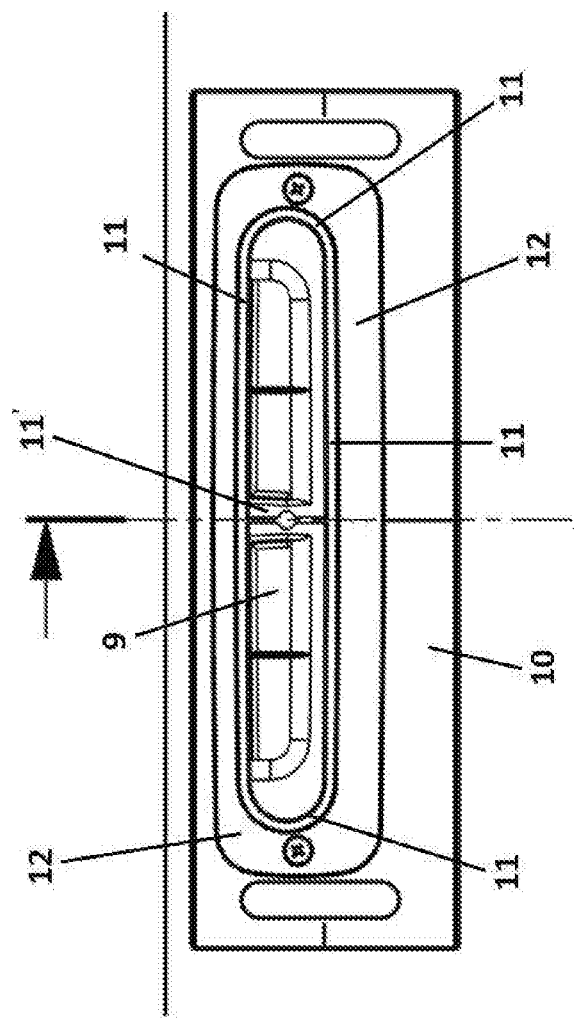
FIG. 22 is a plan view of a drainage device of according to the invention with sealing devices according to the invention.

FIGS. 19 and 20 depict the present inventive sealing device 1 after attachment to the drainage body 2 of a drainage arrangement according to the invention. Similarly, FIGS. 21 and 22 show the same embodiment depicted in FIGS. 19 and 20, respectively, with the addition of an odor trap 11 and a shuttle frame 12 for the odor trap 11 arranged in the gap 10 between the groove 8 and the opening 9.

When the drainage arrangement is installed, a composite seal is applied on the sealing film 3, onto which in turn tiles can be placed.

The sealing device in accordance with the present invention may be incorporated into a drainage channel as the water collection device, for example as illustrated in FIGS. 1 to 10. With this approach, a lateral compensation of the substructure frame within the sealing device 1 or in the gap 10 is possible perpendicular and parallel to the wall.

The sealing device in accordance with the present invention may also be incorporated into a drainage profile as the water collection device, for example as illustrated in FIGS. 11 to 18. With this approach, a lateral compensation of the profile is possible on and within the sealing device and the composite seal arranged above, or in the gap 10 perpendicular and parallel to the wall.

The invention claimed is:

1. A method for at least partial installation in a floor or a room of a drainage arrangement, comprising the steps of:
   providing a drainage body (2) with an opening (9), through which water is drainable, the drainage body (2) having on its top side a groove (8),
   providing a flexible sealing film (3),
   connecting a connecting portion with the sealing film (3) and with a portion of the drainage arrangement, wherein the connecting portion comprises a seal (6) and a support (5) which supports the seal (6), the connecting portion and the flexible sealing film (3) have an opening (4) defined therethrough through which waste water is passable, wherein the connecting portion and sealing film (3) comprise a sealing device (1) arranged at least partially above the drainage body (2), so that water that has passed through the opening (4) of the sealing film (3) is receivable in the opening (9) of the drainage body (2),
   connecting the seal (6) to the support (5) before attaching the sealing device (1) to the drainage arrangement,
   inserting at least in portions the support (5) together with the seal (6) arranged circumferentially about the opening (9) in the drainage body (2) into the groove (8), and snapping in place in the groove (8) or clipping into the groove (8) the support (5) together with the seal (6),
   wherein the groove (8) on the top side of the drainage body (2) is a circumferential groove formed by an inner wall closest to the opening (9) in the drainage body (2), an outer wall farthest from the opening (9) in the drainage body (2) and a bottom wall connecting the inner and the outer walls; wherein the support (5) together with the seal (6) arranged circumferentially about the opening (9) in the drainage body (2) is inserted into the groove (8), the seal (6) does not physically contact the outer wall of the groove (8); and wherein the insertion step further comprises the step of maintaining the position of the seal (6) relative to the support (5) before and after insertion of the support (5) together with the seal (6) into the groove (8).

2. The method according to claim 1, wherein the groove (8) surrounds the opening (9) of the drainage body (2).

3. The method according to claim 2, wherein the groove (8) is at least partially spaced apart from the opening (9) of the drainage body (2) such that a gap (10) exists between the opening (9) of the drainage body (2) and the groove (8).

4. The method according to claim 3, wherein the gap (10) encircles the opening (9) of the drainage body (2).

5. The method according to claim 3, further comprising the step of arranging an odor trap (11) and a removable frame (12) for the odor trap (11) in the gap (10) between the groove (8) and the opening (9).

* * * * *